(12) United States Patent
Sharifi et al.

(10) Patent No.: US 11,587,568 B2
(45) Date of Patent: Feb. 21, 2023

(54) STREAMING ACTION FULFILLMENT BASED ON PARTIAL HYPOTHESES

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 259 days.

(21) Appl. No.: 17/247,334

(22) Filed: Dec. 8, 2020

(65) Prior Publication Data

US 2022/0180868 A1 Jun. 9, 2022

(51) Int. Cl.
*G10L 15/22* (2006.01)
*G06F 3/16* (2006.01)
*G10L 15/07* (2013.01)
*G10L 15/08* (2006.01)

(52) U.S. Cl.
CPC .............. *G10L 15/22* (2013.01); *G06F 3/167* (2013.01); *G10L 15/075* (2013.01); *G10L 15/083* (2013.01); *G10L 2015/223* (2013.01)

(58) Field of Classification Search
CPC ......... G10L 15/22; G10L 15/00; G10L 15/01; G10L 15/04; G10L 15/06; G10L 15/08; G10L 15/822; G10L 15/183; G10L 15/26; G10L 15/34; G10L 2015/0631–0638; G10L 2015/221–228

USPC .... 704/275, 270.1, 270, 277, 231, 243, 244, 704/249, 254, 257
See application file for complete search history.

(56) References Cited

U.S. PATENT DOCUMENTS

| | | | |
|---|---|---|---|
| 11,210,341 B1 * | 12/2021 | Bhagat | G06F 16/90335 |
| 11,256,414 B2 * | 2/2022 | Brody | G06F 3/017 |
| 2016/0203002 A1 * | 7/2016 | Kannan | G10L 15/1822 715/708 |
| 2018/0247065 A1 * | 8/2018 | Rhee | G06V 40/1365 |

* cited by examiner

*Primary Examiner* — Qi Han
(74) *Attorney, Agent, or Firm* — Honigman LLP; Brett A. Krueger; Grant Griffith

(57) ABSTRACT

A method for streaming action fulfillment receives audio data corresponding to an utterance where the utterance includes a query to perform an action that requires performance of a sequence of sub-actions in order to fulfill the action. While receiving the audio data, but before receiving an end of speech condition, the method processes the audio data to generate intermediate automated speech recognition (ASR) results, performs partial query interpretation on the intermediate ASR results to determine whether the intermediate ASR results identify an application type needed to perform the action and, when the intermediate ASR results identify a particular application type, performs a first sub-action in the sequence of sub-actions by launching a first application to execute on the user device where the first application is associated with the particular application type. The method, in response to receiving an end of speech condition, fulfills performance of the action.

28 Claims, 11 Drawing Sheets

STREAMING ACTION FULFILLMENT BASED ON PARTIAL HYPOTHESES

TECHNICAL FIELD

This disclosure relates to streaming action fulfillment based on partial hypotheses.

BACKGROUND

Users frequently interact with voice-enabled devices, such as smart phones, smart watches, and smart speakers, through digital assistant interfaces. These digital assistant interfaces enable users to complete tasks and obtain answers to questions they have all through natural, conversational interactions. Ideally, when conversing with a digital assistant interface, a user should be able to communicate as if the user were talking to another person, via spoken requests directed toward their voice-enabled device running the digital assistant interface. The digital assistant interface will provide these spoken requests to an automated speech recognizer to process and recognize the spoken request so that an action can be performed.

Digital assistant interfaces are moving onto mobile devices in which much of the speech recognition processing occurs on-device without incurring the added latency to connect to a server via a network and send audio data to the server to perform speech recognition using cloud-based speech recognition servers. In addition to improving latency, other benefits of on-device speech recognition include improved reliability and privacy. As such, digital assistant interfaces are becoming deeply integrated with various applications and operating systems running on mobile devices, thereby enabling a user to control their mobile device solely using their voice. However, these applications installed on user devices may themselves be slow, unreliable, or require network access to servers, thereby throttling the benefits that the on-device processing capabilities the digital assistant interface affords and can lead to a sluggish user experience.

SUMMARY

One aspect of the disclosure provides a method for streaming action fulfillment. The method includes receiving, at data processing hardware, audio data corresponding to an utterance spoken by a user of a user device where the utterance includes a query to perform an action where the query requires performance of a sequence of sub-actions in order to fulfill the action. While receiving the audio data, but before receiving an end of speech condition, the method also includes processing, by the data processing hardware, using a speech recognizer, a first portion of the received audio data to generate a first sequence of intermediate automated speech recognition (ASR) results. While receiving the audio data, but before receiving an end of speech condition, the method further includes performing, by the data processing hardware, partial query interpretation on the first sequence of intermediate ASR results to determine whether the first sequence of intermediate ASR results identifies an application type needed to perform the action and, when the first sequence of intermediate ASR results identifies a particular application type, performing, by the data processing hardware, a first sub-action in the sequence of sub-actions by launching a first application to execute on the user device where the first application is associated with the particular application type. The method additionally includes, in response to receiving an end of speech condition, fulfilling, by the data processing hardware, performance of the action. Determining the end of speech condition may include detecting, using the speech recognizer, at least a minimum duration of non-speech in the received audio.

Implementations of the disclosure may include one or more of the following optional features. In some implementations, while receiving the audio data before receiving the end of speech condition and after launching the first application, the method also includes processing, by the data processing hardware, using the speech recognizer, a second portion of the received audio data to generate a second sequence of intermediate ASR results, performing, by the data processing hardware, the partial query interpretation on the second sequence of intermediate ASR results to identify a search query for content in the first application, and performing, by the data processing hardware, a second sub-action in the sequence of actions by instructing the first application to perform the search query for the content in the first application. In these implementations, in response to launching the first application to execute on the user device, the method also includes displaying, by the data processing hardware, in a graphical user interface of the user device, an initial screen having a search field and/or multiple graphical elements each representing different categories of content in the first application. Here, instructing the first application to perform the search query for the content includes entering, into the search field of the first screen, text characterizing the search query for the content in the first application or selecting, from among the multiple graphical elements of the first screen, the graphical element representing the category of content that includes the content specified by the search query. These implementations also may include, after the first application performs the search query for the content, displaying, by the data processing hardware, in the graphical user interface, a second screen presenting one or more results that include the content specified by the search query. In these implementations, the method may further include receiving, at the data processing hardware, a user input indication indicating selection of one of the results presented in the second screen and, in response to receiving the user input indication, detecting, by the data processing hardware, the end of speech condition. These implementations may also include, after the first application performs the search query for the content, processing, by the data processing hardware, using the speech recognizer, a third portion of the received audio data to generate a third sequence of intermediate ASR results, performing, by the data processing hardware, the partial query interpretation on the third sequence of intermediate ASR results to determine whether to update the search query for more specific content, and, when the partial query interpretation performed on the third sequence of intermediate search results determines to update the search query for more specific content, performing, by the data processing hardware, a third sub-action in the sequence of sub-actions by instructing the first application to update the search query for the more specific content.

In some configurations, performing the partial query interpretation on the first sequence of intermediate ASR results may determine that the first sequence of intermediate ASR results identifies the particular application type and fails to specify a slot value associated with naming a specific application for use in fulfilling the action. Here, performing the first sub-action in the sequence of sub-actions includes launching the first application as a default application associated with the particular application type. In these configurations, while receiving the audio data before receiving the end of speech condition and after launching the first application, the method also includes processing, by the data processing hardware, using the speech recognizer, a second portion of the received audio data to generate a second sequence of intermediate ASR results and performing, by the data processing hardware, the partial query interpretation on the second sequence of intermediate ASR results to determine whether the second sequence of intermediate ASR results identify a second application to use for fulfilling the action. Additionally, in these configurations, when the second sequence of intermediate ASR results identify the second application for use in fulfilling the action, the method further includes rolling-back, by the data processing hardware, performance of the first sub-action by ceasing execution of the first application on the user device and re-performing, by the data processing hardware, the first sub-action in the sequence of actions by launching the second application to execute on the user device.

In some examples, while receiving the audio data before receiving the end of speech condition and after launching the first application, the method further includes processing, by the data processing hardware, using the speech recognizer, a second portion of the received audio data to generate a second sequence of intermediate ASR results and performing, by the data processing hardware, the partial query interpretation on the second sequence of intermediate ASR results to identify a second sub-action in the sequence of sub-actions. In these examples, while receiving the audio data before receiving the end of speech condition and after launching the first application, the method also includes determining, by the data processing hardware, a rollback feasibility score associated with the second sub-action where the rollback feasibility indicates a likelihood that a user experience will be degraded if executing the second sub-action has to be rolled back and, when the rollback feasibility score satisfies a rollback feasibility threshold, performing, by the data processing hardware, the second sub-action. When the rollback feasibility score does not satisfy the rollback feasibility threshold, the method may delay performing, by the data processing hardware, the second sub-action until the end of speech condition is received. Also in these examples, the method may further include determining, by the data processing hardware, a confidence score of second sub-action identified by performing the partial query interpretation on the second sequence of intermediate ASR results and when the confidence score of the second sub-action fails to satisfy a confidence threshold, prompting, by the data processing hardware, the user to confirm whether the second sub-action is correctly identified.

Another aspect of the disclosure provides a system for streaming action fulfillment. The system includes data processing hardware and memory hardware in communication with the data processing hardware. The memory hardware stores instructions that when executed on the data processing hardware cause the data processing hardware to perform operations. The operations include receiving audio data corresponding to an utterance spoken by a user of a user device where the utterance includes a query to perform an action where the query requires performance of a sequence of sub-actions in order to fulfill the action. While receiving the audio data, but before receiving an end of speech condition, the operations also include processing, using a speech recognizer, a first portion of the received audio data to generate a first sequence of intermediate automated speech recognition (ASR) results. While receiving the audio data, but before receiving an end of speech condition, the operations further include performing partial query interpretation on the first sequence of intermediate ASR results to determine whether the first sequence of intermediate ASR results identifies an application type needed to perform the action and, when the first sequence of intermediate ASR results identifies a particular application type, performing a first sub-action in the sequence of sub-actions by launching a first application to execute on the user device where the first application is associated with the particular application type. The operations additionally includes, in response to receiving an end of speech condition, fulfilling performance of the action. Determining the end of speech condition may include detecting, using the speech recognizer, at least a minimum duration of non-speech in the received audio.

Implementations of the disclosure may include one or more of the following optional features. In some implementations, while receiving the audio data before receiving the end of speech condition and after launching the first application, the operations also include processing, using the speech recognizer, a second portion of the received audio data to generate a second sequence of intermediate ASR results, performing the partial query interpretation on the second sequence of intermediate ASR results to identify a search query for content in the first application, and performing a second sub-action in the sequence of actions by instructing the first application to perform the search query for the content in the first application. In these implementations, in response to launching the first application to execute on the user device, the operations also include displaying in a graphical user interface of the user device, an initial screen having a search field and/or multiple graphical elements each representing different categories of content in the first application. Here, instructing the first application to perform the search query for the content includes entering, into the search field of the first screen, text characterizing the search query for the content in the first application or selecting, from among the multiple graphical elements of the first screen, the graphical element representing the category of content that includes the content specified by the search query. These implementations also may include, after the first application performs the search query for the content, displaying in the graphical user interface, a second screen presenting one or more results that include the content specified by the search query. In these implementations, the operations may further include receiving a user input indication indicating selection of one of the results presented in the second screen and, in response to receiving the user input indication, detecting the end of speech condition. These implementations may also include, after the first application performs the search query for the content, processing using the speech recognizer, a third portion of the received audio data to generate a third sequence of intermediate ASR results, performing the partial query interpretation on the third sequence of intermediate ASR results to determine whether to update the search query for more specific content, and, when the partial query interpretation performed on the third sequence of intermediate search results determines to update the search query for more specific content, performing a third sub-action in the sequence of sub-actions by instructing the first application to update the search query for the more specific content.

In some configurations, performing the partial query interpretation on the first sequence of intermediate ASR results may determine that the first sequence of intermediate ASR results identifies the particular application type and fails to specify a slot value associated with naming a specific application for use in fulfilling the action. Here, performing the first sub-action in the sequence of sub-actions includes launching the first application as a default application associated with the particular application type. In these configurations, while receiving the audio data before receiving the end of speech condition and after launching the first application, the operations also include processing, using the speech recognizer, a second portion of the received audio data to generate a second sequence of intermediate ASR results and performing, by the data processing hardware, the partial query interpretation on the second sequence of intermediate ASR results to determine whether the second sequence of intermediate ASR results identify a second application to use for fulfilling the action. Additionally, in these configurations, when the second sequence of intermediate ASR results identify the second application for use in fulfilling the action, the operations further include rolling-back performance of the first sub-action by ceasing execution of the first application on the user device and re-performing, by the data processing hardware, the first sub-action in the sequence of actions by launching the second application to execute on the user device.

In some examples, while receiving the audio data before receiving the end of speech condition and after launching the first application, the operations further include processing, using the speech recognizer, a second portion of the received audio data to generate a second sequence of intermediate ASR results and performing, by the data processing hardware, the partial query interpretation on the second sequence of intermediate ASR results to identify a second sub-action in the sequence of sub-actions. In these examples, while receiving the audio data before receiving the end of speech condition and after launching the first application, the operations also include determining a rollback feasibility score associated with the second sub-action where the rollback feasibility indicates a likelihood that a user experience will be degraded if executing the second sub-action has to be rolled back and, when the rollback feasibility score satisfies a rollback feasibility threshold, performing, by the data processing hardware, the second sub-action. When the rollback feasibility score does not satisfy the rollback feasibility threshold, the operations may delay performing the second sub-action until the end of speech condition is received. Also in these examples, the operations may further include determining, by the data processing hardware, a confidence score of second sub-action identified by performing the partial query interpretation on the second sequence of intermediate ASR results and when the confidence score of the second sub-action fails to satisfy a confidence threshold, prompting, by the data processing hardware, the user to confirm whether the second sub-action is correctly identified.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
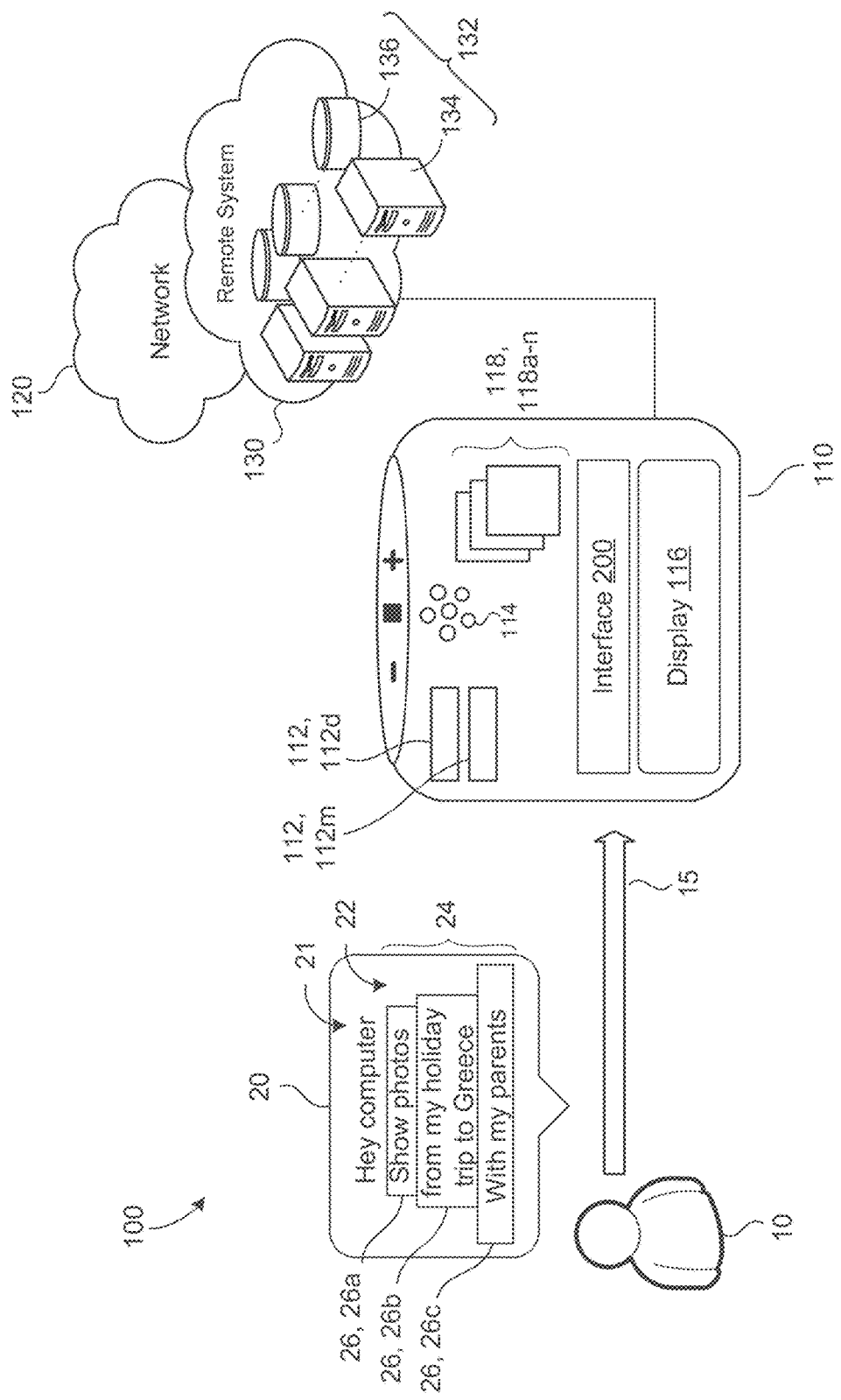
FIG. 1 is a schematic view of an example speech environment for performing fulfillment based on partial speech recognition results.

Conventionally, digital assistant interfaces that enable users to complete tasks and obtain answers to questions they have through natural, conversational interactions have required the processing of servers to support speech recognition and language understanding models. These server-based models were not suitable for execution on device due to their size, which could exceed the available storage or memory on the device. However, recent advancements in recurrent neural networks have enabled the development of new speech recognition and language understanding models of drastically reduced size (e.g., less than half a gigabyte) suitable for storage and processing on-device. As such, digital assistant interfaces are moving onto mobile devices in which much of the speech recognition processing occurs on-device without incurring the added latency to connect to a server via a network and send audio data to the server to perform speech recognition using cloud-based speech recognition servers. User experience is drastically enhanced since transcriptions of speech can occur in real-time and without a network connection. In addition to improving latency, other benefits of on-device speech recognition include improved reliability and privacy. As such, digital assistant interfaces are becoming deeply integrated with various applications and operating systems running on mobile devices, thereby enabling a user to control their mobile device solely using their voice. For example, a user could multi-task across multiple applications running on the device, such as creating a calendar invite, finding and sharing a photo with friends, or dictating an email. However, these applications installed on user devices may themselves be slow, unreliable, or require network access to servers, thereby throttling the benefits that the on-device digital assistant interface affords and can lead to a sluggish user experience.

Generally, in speech recognition systems, speech endpointing is the process of determining which part of incoming audio contains speech by determining a beginning and an end of an utterance. The part of incoming audio corresponding to speech is provided to a speech recognizer to obtain a speech recognition result or a transcript of the audio. User perceived latency of speech recognition is the time from when the user stops speaking until the speech recognition result or transcript is output, often output for display on a screen of a user device. The recent advancements made to run speech recognition models on-device have allowed for real-time speech recognition results (e.g., streaming transcription) to display as the user speaks and before endpointing determines the end of the utterance.

Yet, while the user perceived latency of the actual speech recognition has been improved by processing speech on-device, a user perceived latency of fulfillment of user queries/commands still exists since an endpoint identifying the end of the utterance has to be made before the actual fulfillment can take place. For example, a command for "Play rock music playlist on YouTube Music" spoken by a user to a digital assistant interface executing on the user's phone requires performance of multiple sub-actions in order to fulfill the complete action of streaming the user's rock music playlist from the YouTube Music service for audible output through an acoustic speaker. These sub-actions include launching the YouTube Music application on the user's phone, accessing a search box in the YouTube Music to input a query for the rock music playlist or switching to a playlists tab in the YouTube Music to select the rock music playlist, and finally executing audible playback of the rock music playlist from the YouTube Music application. In this example, the system has to wait for the end pointer to endpoint the end of the utterance and obtain the final speech recognition result before initiating the first sub-action that needs to be fulfilled, e.g., launching the YouTube Music application.

Implementations herein are directed to generating intermediate speech recognition results from a user utterance commanding performance of an action and using the intermediate speech recognition results to perform multiple sub-actions related to the final action while the user is still speaking the utterance. The leveraging of available intermediate speech recognition results to identify and to perform sub-actions related to a final action before the user finishes speaking drastically reduces user perceived latency since waiting for a final endpoint is not required before initiating performance of a first sub-action in a sequence of sub-actions that need to be performed in order to fulfill the final action.

Yet, intermediate recognition results of "Play", "rock music", and "playlist" occur before the final endpoint and are available to identify possible sub-actions related to the query. For instance, the intermediate recognition result of "Play" can indicate that the user wants to play media content, which could include video content such as television programming, movies, or video clips, or audio content from one of multiple music applications on the user device. Next, the intermediate recognition result of "rock music" provides context that narrows the type of media content the user wants to play to audio content. Now, the possible available sub-actions are opening either a streaming radio application, a Spotify application, or a YouTube application on the user's phone that all can potentially output rock music. For instance, the streaming radio, Spotify, and YouTube applications all include their own rock music channels, while the Spotify and YouTube applications each include respective rock music playlists for the user. Once the intermediate recognition result of "playlist" becomes available, the available possible sub-actions are now more specific to indicate that a rock music playlist needs to be accessed on the Spotify application or the YouTube application.

Referring to FIG. 1, in some implementations, the speech environment 100 includes a user 10 speaking an utterance 20 directed toward a voice-enabled device 110 (also referred to as a device 110 or a user device 110) executing a digital assistant interface 200. Here, the utterance 20 spoken by the user 10 may be captured by the device 110 in streaming audio 15 and may correspond to a query to perform an action 24, and more specifically, a query 22 for the digital assistant interface 200 to perform an action 24. The user 10 may prefix the query 22 with a hotword 21 (e.g., invocation phrase) to trigger the device 110 from a sleep or hibernation state when the hotword 21 is detected in the streaming audio 15 by a hotword detector running on the device 110 while in the sleep or hibernation state. The action 24 may also be referred to as an operation or task. In this sense, the user 10 may have conversational interactions with the digital assistant interface 200 executing on the voice-enabled device 110 to perform computing activities or to find answers to questions.

The device 110 may correspond to any computing device associated with the user 10 and capable of capturing audio from the environment 100. Some examples of user devices 110 include, but are not limited to, mobile devices (e.g., mobile phones, tablets, laptops, e-book readers, etc.), computers, wearable devices (e.g., smart watches), music players, casting devices, smart appliances (e.g., smart televisions) and internet of things (IoT) devices, remote controls, smart speakers, etc. The device 110 includes data processing hardware 112d and memory hardware 112m in communication with the data processing hardware 112d and storing instructions, that when executed by the data processing hardware 112d, cause the data processing hardware 112d to perform one or more operations related to speech processing.

The device 110 further includes an audio subsystem with an audio capturing device (e.g., an array of one or more microphones) 114 for capturing and converting audio within the speech environment 100 into electrical signals (e.g., audio data 14 (FIGS. 2A-2E). While the device 110 implements the audio capturing device 114 (also referred to generally as a microphone 114) in the example shown, the audio capturing device 114 may not physically reside on the device 110, but be in communication with the audio subsystem (e.g., peripherals of the device 110). For example, the device 110 may correspond to a vehicle infotainment system that leverages an array of microphones positioned throughout the vehicle.

The device 110 may also include a display 116 to display graphical user interface (GUI) elements (e.g., windows, screens, icons, menus, etc.) and/or graphical content. For example, the device 110 may load or launch applications 118, 118a-n that generate GUI elements or other graphical content for the display 116. Moreover, the elements generated in the display 116 may be selectable by the user 10 and also serve to provide some form of visual feedback to processing activities and/or operations occurring on the device 110. Furthermore, since the device 110 is a voice-enabled device 110, the user 10 may interact with elements generated on the display 116 using various voice commands. For instance, the display 116 may depict a menu of options for a particular application 118 and the user 10 may use the interface 200 to select an option through speech.

In some implementations, the device 110 communicates via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing. For instance, some portion of the assistant interface 200 may reside on the remote system 130. In one example, a speech recognizer 210 executes locally on the device 110 to provide on-device automated speech recognition (ASR). In another example, the speech recognizer 210 resides on the remote system 130 to provide server-side ASR for the assistant interface 200. In yet another example, functionality of the speech recognizer 210 is split across the device 110 and the server 130 (e.g., the device 110 and the server 130 perform parallel ASR processing).

The speech-enabled interface 200 may field the query/command 22 conveyed in the spoken utterance 20 captured in streaming audio 15 by the device 110. The speech-enabled interface 200 (also referred to as the interface 200 or the assistant interface 200) generally facilitates receiving audio data 14 corresponding to an utterance 20 captured by the audio capturing device 114, coordinating speech processing on the audio data 14, performing semantic interpretation on the audio data 14 to identify a query 22 to perform an action 24, and performing a sequence of sub-actions 26, 26a-n in order to fulfill the action 24. The interface 200 may execute on the data processing hardware 112d of the device 110. When the microphone 114 of the device 110 captures an utterance 20 in streaming audio 15 and converts the audio into audio data 14, the audio data 14 corresponding to the utterance 20 is relayed to the interface 200 such that the interface 200 can perform speech recognition and semantic interpretation to identify and ultimately fulfill a query 22 conveyed in the spoken utterance 20. Although traditionally, fulfillment systems have had to wait for an endpointer (e.g., part of the speech recognizer or a separate component) to endpoint the end of an utterance 20 to obtain the final speech recognition result before initiating performance of an action 24 specified by the query/command 22, here, the interface 200 fulfills sub-actions 26 associated with the final action 24 as partial speech recognition results (e.g., partial hypotheses) are generated and before the user 10 is finished speaking the query 22 in the utterance 20. By leveraging partial speech recognition results, the interface 200 may provide the user 10 with real-time or near real-time feedback as to sub-actions 26 the interface 200 is performing in order to fulfill an action 24 specified by the query 22 once the utterance 20 is endpointed. In other words, the interface 200 strives to perform sub-actions 26 interpreted from intermediate speech recognition results for the audio data 14 while the user 10 is actively speaking the utterance 20.

In some implementations, to perform a sequence of sub-actions 26 in order to fulfill an action 24, the interface 200 interfaces with a plurality of applications 118, 118a-n on the device 110 or accessible to the device 110. An application 118 generally refers to any application 118 that is configured to run on the device 110. Some types of applications 118 include media applications (e.g., video streaming applications, audio streaming applications, media player applications, media gallery applications, etc.), word processing applications, navigation applications, social media applications, communication applications (e.g., messaging applications, email applications, etc.), financial applications, organizational applications (e.g., address book applications), retail applications, entertainment applications (e.g., news applications, weather applications, sport applications), casting applications, etc. The interface 200 may be integrated with these applications 118 to enable the user 10 to control applications on the device 110 using his or her voice. For example, the interface 200 is an application programming interface (API) or any other type of program or application configured to execute the functionality of the interface 200.

With continued reference to FIG. 1, the user 10 speaks an utterance 20 that states "hey computer, show photos from my holiday trip to Greece with my parents." Here, the utterance 20 is a voice query/command 22 asking the interface 200 to perform the action 24 of displaying a particular set of the user's photos. While the interface 200 receives audio data 14 corresponding to this utterance 20, portions of the utterance 20 are processed as they are received at the interface 200 in order to generate intermediate speech results 212 (FIGS. 2A-2E). The intermediate speech results 212 are interpreted by the interface 200 to identify sub-actions 26 associated with a candidate action 24 while the user 10 is speaking the utterance 20. For instance, the complete action 24 specified by the query 22 once the utterance 20 is complete includes a sequence of four sub-actions 26, 26a-d that may be performed as the user 10 speaks the utterance 20 rather than waiting for the user 10 to finish speaking the utterance 20.

Referring to FIGS 2A-2H, the assistant interface 200 generally includes a speech recognizer 210, an interpreter 220, and an executor 230. The speech recognizer 210 receives audio data 14 as an input and processes the audio data 14 to generate a speech recognition result 212. As the speech recognizer 210 performs speech recognition on the audio data 14, the speech recognizer 210 may generate intermediate speech results 212. Here, an intermediate speech recognition result 212 refers to a result that is generated over some subset of the audio data 14 (e.g., a portion of the audio data) instead of the entirety of the audio data 14. Generally speaking, speech recognition may occur for an entire phrase (e.g., an entire utterance) or some subset of a phrase, such as characters, wordpieces, and/or words. Stated differently, each recognition result in a sequence of speech recognition results (e.g., a sequence of intermediate speech recognition results 212) may correspond to a character, wordpiece, and/or word combined to form a final recognition result (e.g., transcription) of the utterance 20. For instance, when speech recognition occurs over an audio stream, a speech recognition model performing speech recognition may generate an output (i.e., a result or hypothesis) at each time step in a streaming fashion. Here, the frame-by-frame outputs may correspond to intermediate speech recognition results that may be combined to form one or more sequences of speech recognition results 212 representative of respective portions of the audio data 14. In some configurations, a speech recognition result corresponds to the top-N hypotheses at any given time step such that multiple hypotheses may be processed at once for generating all possible partial query interpretations. Since the audio data 14 may correspond to an utterance 20 spoken by the user 10, a portion of the audio data 14 may correspond to a portion of the utterance 20. For example, when the audio data 14 corresponds to the utterance 20 of "show photos from my holiday trip to Greece with my parents," a portion of the audio data 14 may be a sequence of characters forming one or more words. As shown FIGS. 2B-2D, a first sequence of intermediate speech recognition results 212a for a first portion 14, 14a of the audio data 14 includes the phrase "show photos." A second sequence of intermediate speech recognition results 212b for a second portion 14, 14b of the audio data 14 includes the phrase "from my holiday trip to Greece." A third sequence of intermediate speech recognition results 212c for a fourth portion 14, 14c of the audio data 14 includes the phrase "with my parents."

The interpreter 220 receives one or more sequences of intermediate speech recognition results 212 and performs partial query interpretation on the one or more intermediate speech recognition results 212. For instance, the interpreter 220 performs semantic interpretation (e.g., grammar interpretation) on a sequence of intermediate speech recognition results 212 to understand a portion of the utterance 20 and its context to identify any candidate sub-actions 26 that may be associated with a final action 24 to be specified once the query 22 is revealed when the user 10 finished speaking the utterance 20. Here, because the interpreter 220 is interpreting a sequence of intermediate speech recognition results 212 that corresponds to only a portion of the query 22, the interpreter 220 is able to derive the context of a sub-action 26 from the sequence of intermediate speech recognition results 212 corresponding to a portion of the utterance 20. Accordingly, the result of the partial query interpretation performed on a sequence of intermediate speech results 212 includes an interpretation 222 that may characterize a sub-action 26 that the query/command 22 will involve in order to fulfill a final action 24 that remains unknown until the user is finished speaking the utterance 20. When the interpreter 220 performs partial query interpretation, the interpretation 222 may suffer from some missing information due to the inherent fact that the interpretation is unable to contextualize the entirety of the utterance 20. Stated differently, the sub-actions 26 characterized by interpretations 222 may become increasingly specific as the number of sequences of intermediate speech recognition results 212 generated from the audio data 14 increases. For this reason, the interpreter 220 may form as complete of an interpretation 222 as possible by deriving a missing intent from the available information from a sequence of intermediate speech recognition results 212. For example, the interpreter 220 may perform partial query interpretation on an initial sequence of intermediate speech recognition results 212 to identify a particular application type needed to perform an action 24, but fails to specify a slot value associated with naming a specific application 118 for use in fulfilling the action 24 since the interpreter 220 cannot confidently identify the specific application 118 from the initial sequence of intermediate speech recognition results 212. In this example, the executor 230 may be configured to perform a first sub-action 26 by launching a default application 118 associated with the particular application type since the slot value associated with naming the specific application 118 is not specified (e.g., empty).

Figure 2A:
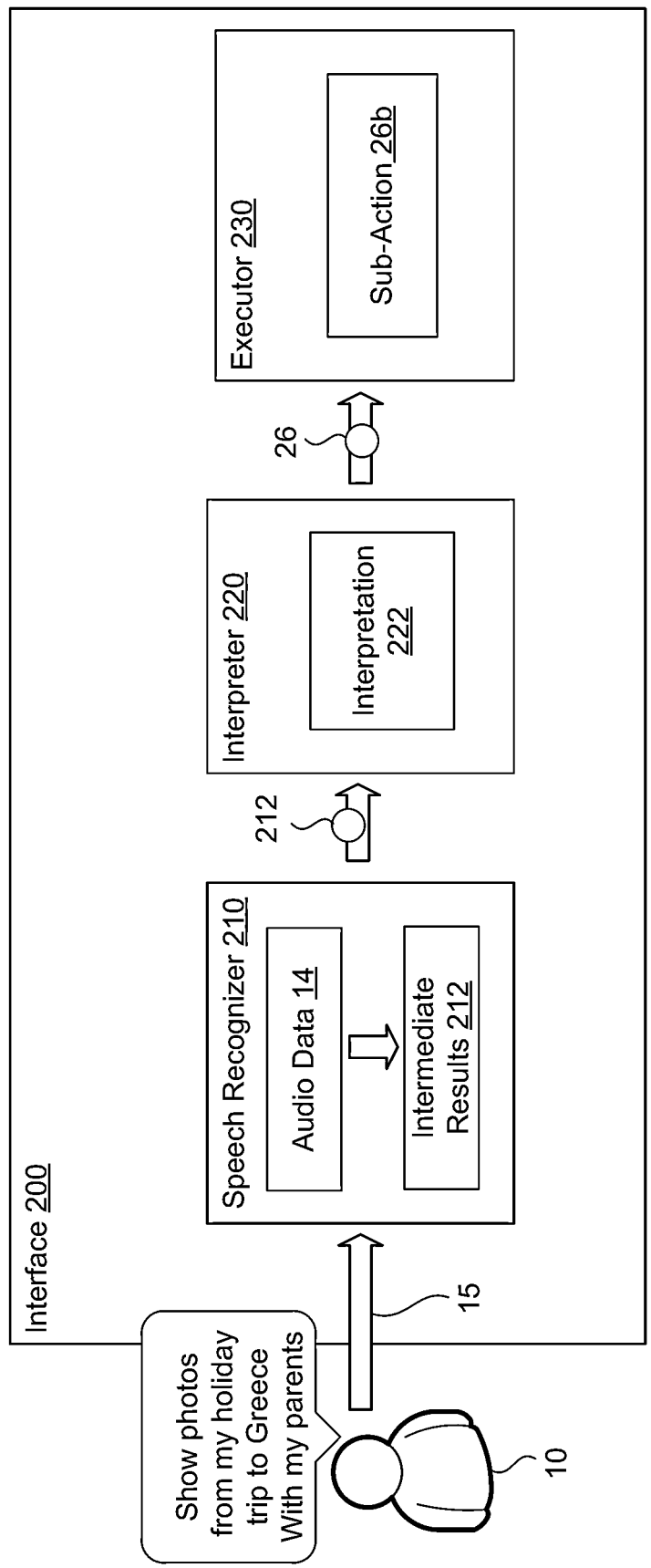
FIG. 2A-2H are schematic views of example assistant interfaces for the speech environment of FIG. 1.
Figure 2B:
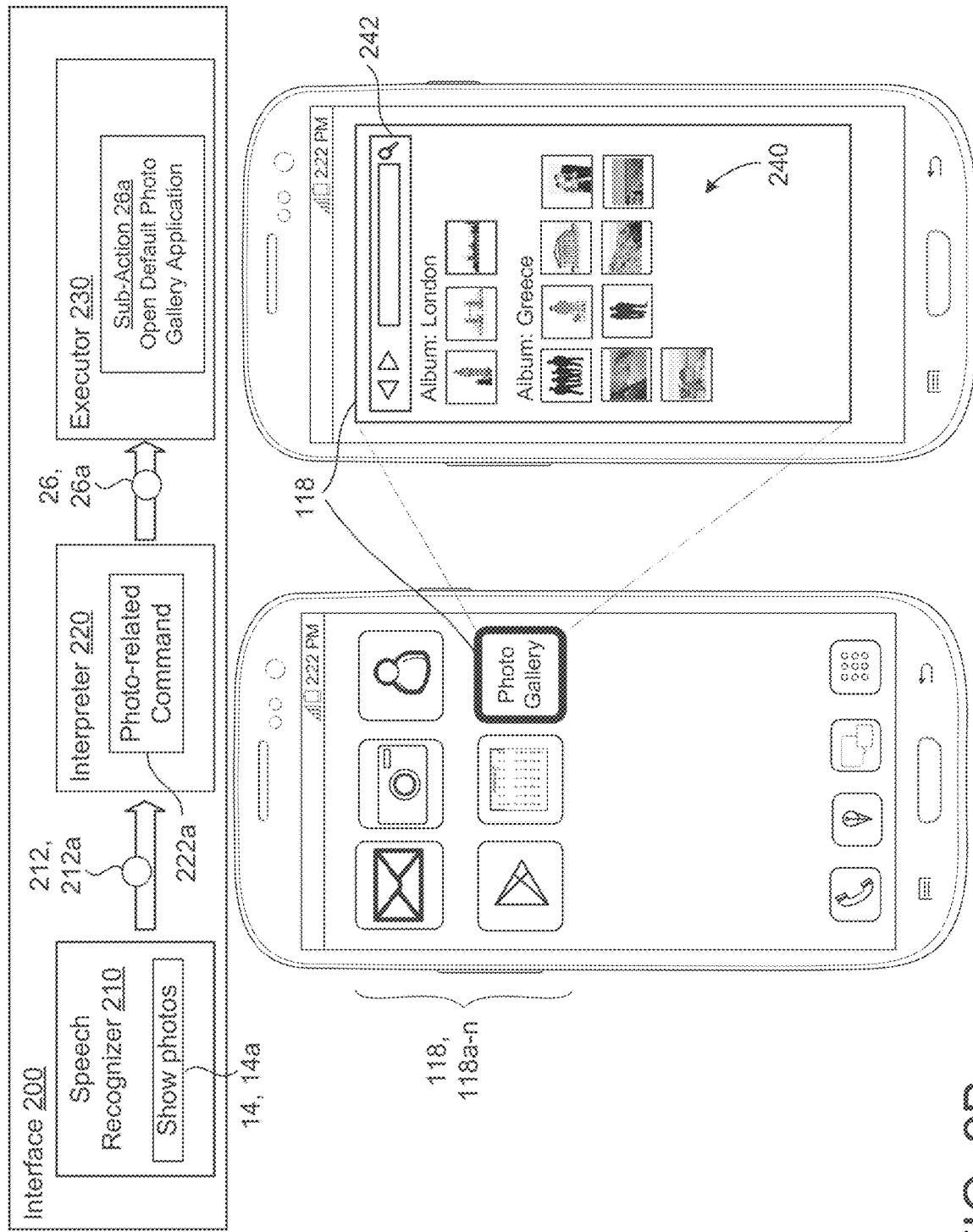

Referring to the example shown in FIG. 2B, when the interpreter 220 generates a first interpretation 222, 222a for the phrase "show me photos" indicated by the first sequence of intermediate speech recognition results 212, 212a, the interpreter 220 is clearly lacking, at the time of interpretation, the context of which particular photos to show. Because of this limited context, the interpreter 220 generates a more general interpretation 222, 222a that indicates that the user 10 is likely issuing a query 22 that will likely require launching a photo application 118 on the device 110. This means that the interpreter 220 may infer a particular application type (e.g., photo applications) from the first sequence of intermediate speech recognition results 212a, "show me photos," even though a name of a specific photo application cannot be derived from the partial query interpretation performed on the first sequence of intermediate speech recognition results 212a. Moreover, as the user 10 continues to speak the utterance 20, the speech recognizer 210 generates additional sequences of intermediate speech recognition results 212, 212b-d and the interpreter 220 performs partial query interpretation on each of the sequences of intermediate speech recognition results 212 to generate respective interpretations 222, 222b-d that provide additional context to the query 22. In other words, the interpreter 220 performs partial query interpretation on each sequence of intermediate speech recognition results 212 while the user 10 is speaking to identify and construct a sequence of sub-actions 26 that need to be performed in order to fulfill an action 24. The executor 230 may execute some or all of these sub-actions 26 before the user is finished speaking and then ultimately complete fulfillment of the action 24 responsive to receiving an end of speech condition when user 10 is finished speaking the utterance 20. At the time the end of speech condition is received, the executor 230 may have already performed each sub-action 26 in the sequence of sub-actions 26 that are needed in order to fulfill the query 22, and thus, fulfilled the action 24 by the time the end of speech condition is received.

Figure 2C:
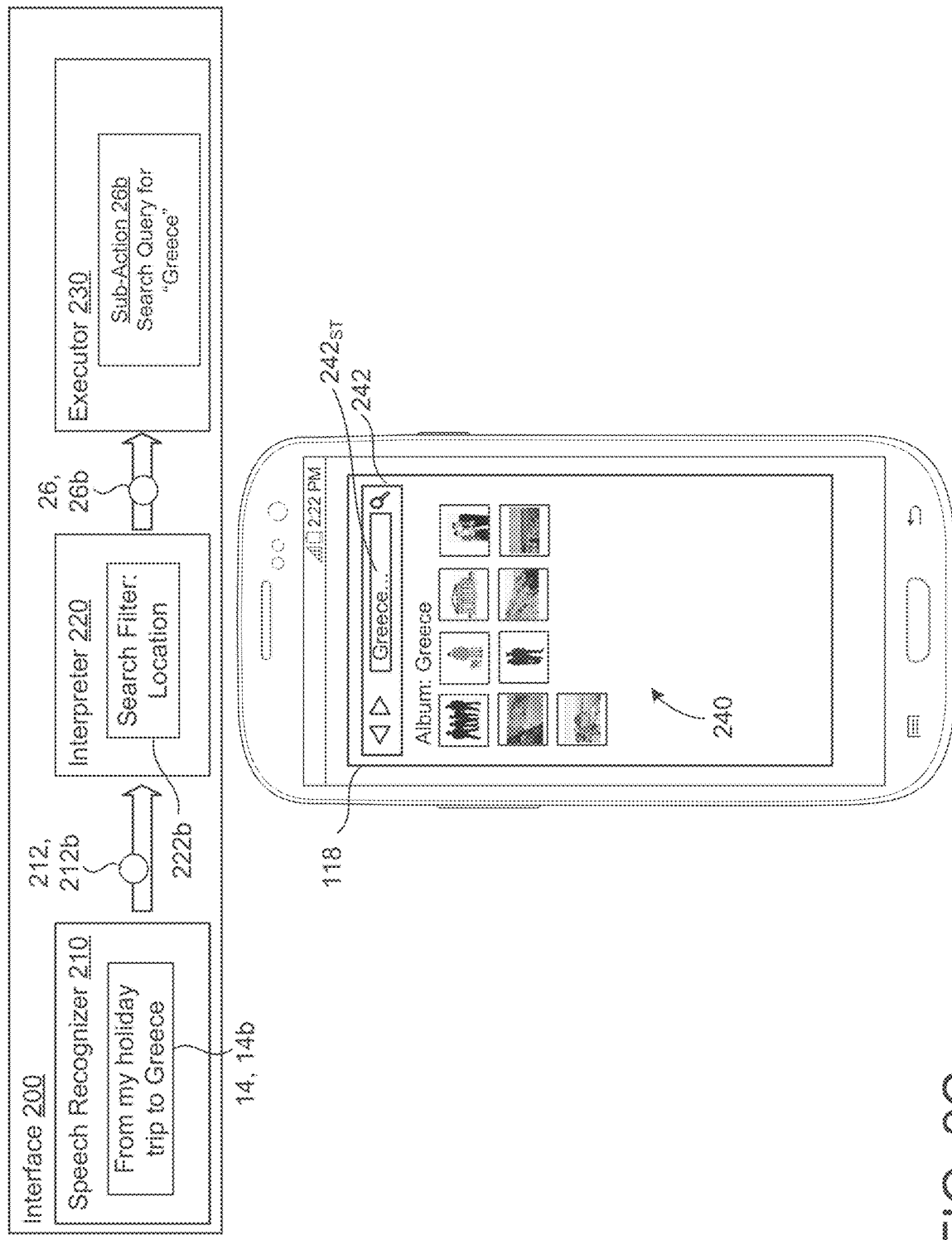

In FIG. 2C, the interpreter 220 performs partial query interpretation on the second sequence of intermediate speech recognition results 212, 212b of "from my holiday trip to Greece" to generate a second interpretation 222, 222b that identifies a search filter (e.g., search query) on a variable of location with respect the user 10 within the photo application 118. Based on the second interpretation 222b, the executor 230 may perform a second sub-action 22, 26c by filtering photos in the local photo gallery application on the variable of location). For instance, FIG. 2C illustrates the user's albums are filtered on the variable of location.

In some examples, a subsequent interpretation 222 may void a prior interpretation 222. For instance, if the first interpretation 222, 222a led to the executor 230 launching two plausible photo applications 118 in parallel where one was a local photo gallery application and the other was a third-party photo gallery accessible via a browser application, the second interpretation 222, 222b that identifies that the filter of time relates specifically to the user 10 (e.g., based on the word "my" preceding the word "holiday) would void/rollback the action of opening the third-party photo gallery because that gallery will not include any user-specific photos.

Figure 2D:
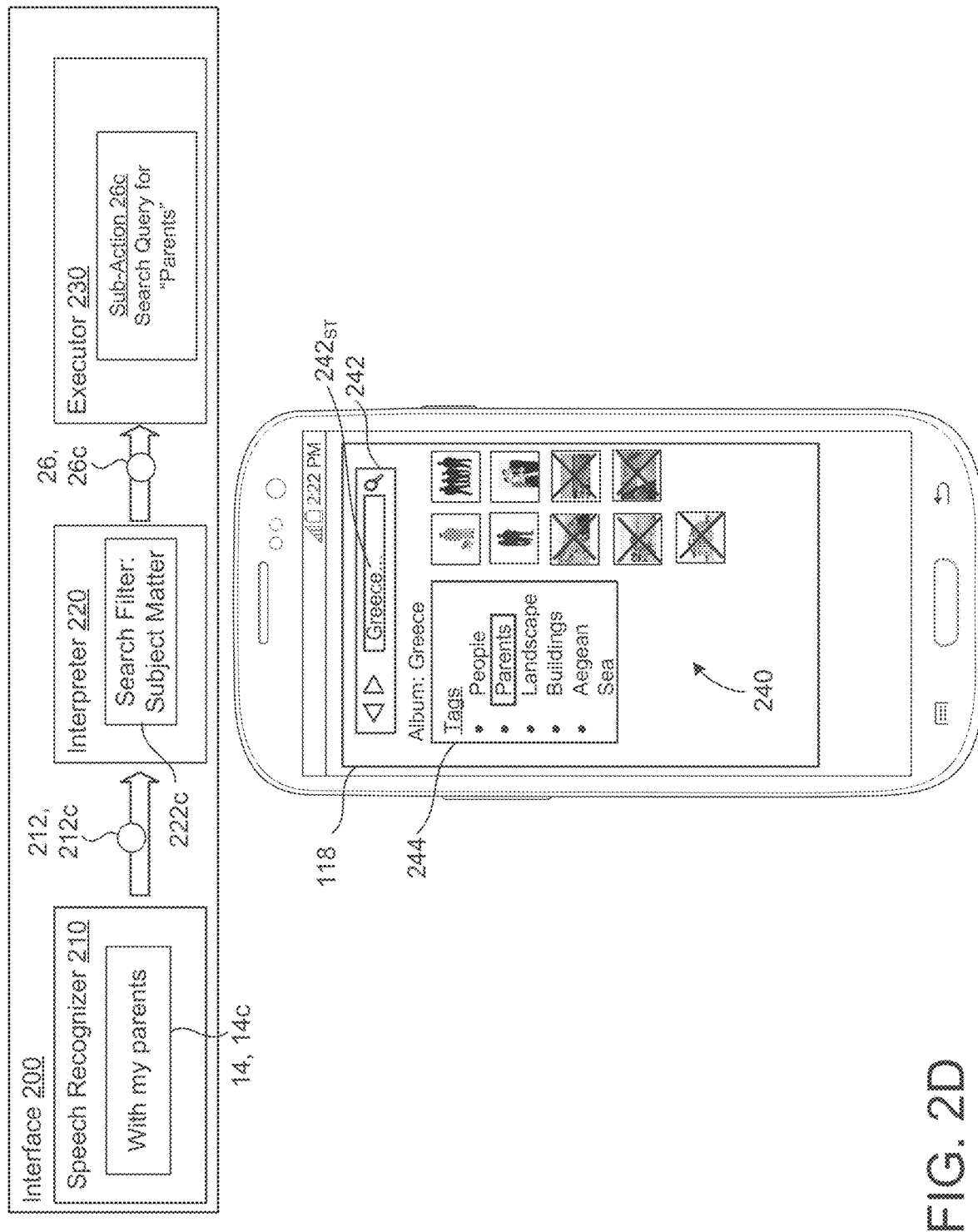

Referring to FIG. 2D, the interpreter 220 performs partial query interpretation on the third sequence of intermediate speech recognition results 212, 212c of "with my parents" to generate a third interpretation 222, 222c that identifies another search filter (e.g., search query) for the presence of the user's parents within the photos. This means that the third interpretation 222c will result in the executor 230 performing a third sub-action 26, 26c of further filtering the photos in the local photo gallery application by subject matter (i.e., the subject matter of the user's parents).

In some configurations, the interpreter 220 uses an interpretation model that generates a confidence level for a given interpretation 222. In some implementations, the interpreter 220 generates multiple possible interpretations 222 for the same sequence of intermediate speech recognition results 212 and each possible interpretation 222 may have a respective confidence level. Furthermore, the speech recognizer 210 may generate multiple different candidate sequences of intermediate speech recognition results 212 for a same portion of audio data 14 and the interpreter 220 may generate one or more possible interpretations 222 for each candidate sequence of intermediate speech recognition results 222. Yet in some approaches, the interface 200 may only want to pursue a limited number of interpretations 222 (e.g., one interpretation 222) or interpretations 222 that indicate a confidence level above some interpretation confidence threshold. Here, when the interpreter 220 generates multiple possible interpretations 222 for a given sequence of intermediate speech recognition results 212 and with confidence levels satisfying an interpretation confidence threshold, the executor 230 may process respective sub-actions 26 characterized by the possible interpretations 222 in parallel. With the sub-actions 26 processing in parallel, the interface 200 may graphically display each parallel track on the display 116 and enable the user 10 to select a particular track, or even modify his or her utterance 20 to change the behavior of the interpreter 220 and/or executor 230.

Proceeding with the example of FIGS. 2B-2D, when the executor 230 receives the first interpretation 222a that identifies photo applications as a particular application type needed to perform an action 24, the executor 230 performs a first sub-action 26a by launching a first photo application 118. Here, while the partial query interpretation performed on the first sequence of intermediate ASR results 212a identifies the particular application type (e.g., photo applications), the partial query interpretation fails to specify a slot value associated with naming a specific photo application for use in fulfilling the action 24. Accordingly, the first photo application 118 corresponds to a default photo application that the user 10 may have previously specified to use as default (e.g., for photos) or one the user 10 uses most frequently. As shown in FIG. 2B, the display 116 may depict the launching of the first photo application 118 by showing a graphical icon representing the first photo application 118 being selected and proceeding to display a graphical user interface (GUI) 240 for the first photo application 118.

When, as shown in FIG. 2C, the executor 230 receives the second interpretation 222b that identifies the search filter relating to photos with the user during holiday time in Greece, the executor 230 performs a second sub-action 26b by instructing the first photo application 118 launched on the device 110 to perform a search query for photos of the user during holiday time in Greece. For instance, comparing FIGS. 2B and 2C, originally the application 118, when launched, displayed two photo albums sorted by location. One album depicting London photos and the other album depicting photos from Greece. Here, the executor 230 may instruct the application to input text characterizing the search query (e.g., text saying "Greece" as a search term $242_{ST}$) into a search field 242 of the GUI 240 for the first photo application 118 displayed on the display 116. By executing this search query, FIG. 2C depicts the nine photo thumbnails from the album "Greece." Following the second sub-action 26b, the executor 230 receives the third interpretation 222c that identifies the search filter relating to photos with the user 10 in Greece that includes the user's parents. The executor 230 performs the third sub-action 26c by sorting the photos in the "Greece" album by people. Here, this search/filter selects four of the nine photos that resulted from the previous sub-step 26b and displays these four photos within the first photo application 118. As illustrated by FIG. 2D, the GUI 240 for the first photo application 118 includes two different methods having different GUI elements for searching or filtering content within the first photo application 118. In this example, the user 10 may use a first GUI element corresponding to a search field 242 to search the content of the application 118 (e.g., to search photos within the first photo application 118). The application 118 also includes GUI element corresponding to a menu of sorting/featuring options. Specific to this example, the menu 244 depicts a list of photo tags that allow the user 10 to sort his or her photos by tags that have been associated with photos of the first photo application 118. A tag generally refers to an identifier that may be shared across one or more content elements (e.g., photos). In this example, the executor 230 may select the option of "parents" within the menu 244 to instruct the executor 230 to filter the user's photos of Greece by whether the user's parents are present.

In some configurations, when the utterance 20 is complete or endpointed, the executor 230 performs complete fulfillment of the action 24. Here, the utterance 20 may be endpointed when the speech recognizer 210 detects some designated minimum duration of time of non-speech in the audio data 14. The executor 230 may perform a highest confidence action 24 based on the full speech recognition result for the entirety of the audio data 14 (or utterance 20). In these configurations, the executor 230 may roll back (rescind or terminate) previous sub-actions 26 that occurred prior to the fulfillment of the entire action 24. For instance, the executor 230 rolls back one or more sub-actions 26 that are inconsistent with the entire action 24. Generally speaking, the sub-action execution process aims to be in a final state that matches the final state of the execution process of the full action 24. However, depending on the query/command 22, this may not always be the case. Hence, roll back(s) allow the interface 200 to flexibly accommodate for different scenarios.

In some implementations, the executor 230 may roll back previous sub-actions 26 based not only on the entire action 24, but on other sub-actions 26 prior to the utterance 20 being endpointed. To illustrate, as described above, the interpreter's first interpretation 222 may have led to two plausible photo-related types of applications 118 where one was a local photo gallery application and the other was a third-party photo gallery in a browser application. Yet later interpretations 222 of sub-actions 26 confirmed that the application 118 could not have been the third-party photo gallery application because it would not contain photos of the user 10. In this respect, the executor 230 would roll back the first sub-action 26 for the launching of the third-party photo gallery in favor of the local photo gallery application. If the executor 230 actually launched the third-party photo gallery, but did not also launch the local photo gallery application, the executor 230, based on the later interpretations 222, may roll back the first sub-action 26 for the launching of the third-party photo gallery by ceasing execution of the third-party photo gallery and instead re-perform the first sub-action 26 by launching the local photo gallery application.

Additionally or alternatively, there may be certain sub-actions 26 that the interface 200 is not able to roll back, or that rolling back the sub-action 26 would negatively impact the user's experience. For example, when the sub-action 26 is to purchase an item on a retail application 118, the interface 200 may not be able to roll back such a purchase or do so without user intervention. Here, a sub-action 26 that the interface 200 is not able to roll back may be referred to as an irreversible sub-action 26. In these irreversible sub-actions 26, the executor 230 may prompt the user 10 for authorization or action confirmation while executing an irreversible sub-action 26. Another approach to irreversible sub-actions 26 is to identify an irreversible sub-action 26 and, when a sub-action 26 is identified as irreversible, the executor 230 waits to perform complete fulfillment of the action 24. That is, it may be safer to have the entire context of a full speech recognition result interpreted rather than a partial speech recognition result 212. In yet another approach, before the utterance 20 is endpointed, but after the executor 230 launches an application 118, the executor 230 may determine a rollback feasibility score for a sub-action 26. Here, the rollback feasibility score indicates a likelihood that the user's experience will be degraded or detrimentally impacted if the executor 230 rolls back the sub-action 26. When the rollback feasibility score satisfies a rollback feasibility threshold, the executor 230 may proceed to execute the sub-action 26. On the other hand, when the rollback feasibility score fails to satisfy the rollback feasibility threshold, the executor 230 may roll back the sub-action 26 or delay the roll back of the sub-action 26 to determine whether the complete fulfillment of the action 24 indicates that the sub-action 26 should be rolled back or not, and rolling it back accordingly.

Because the user 10 may see results of sub-actions 26 being performed by the interface 200 while the user 10 is speaking, the user 10 may, in some circumstances, endpoint an utterance manually before the user finishes speaking the complete utterance. Namely, when the user 10 is seeking a particular result from the device 110, if the particular result is displayed for the user 10 prior to completing the utterance 20, the user 10 may abandon the completion of the utterance 20 since the purpose has already been achieved. For instance, using the example of FIGS. 2B-2D, if all of the user's photos in the Greece album included the user's parents, the second sub-action 26b and the third sub-action 26c would produce the same results. In this scenario, the user 10 may recognize that the device 110 has successfully displayed his or her photos with his or her parents from the Greece trip. Based on this recognition, the user 10 may endpoint the utterance 20 early (i.e., before stating the portion, "with my parents").

Figure 2E:
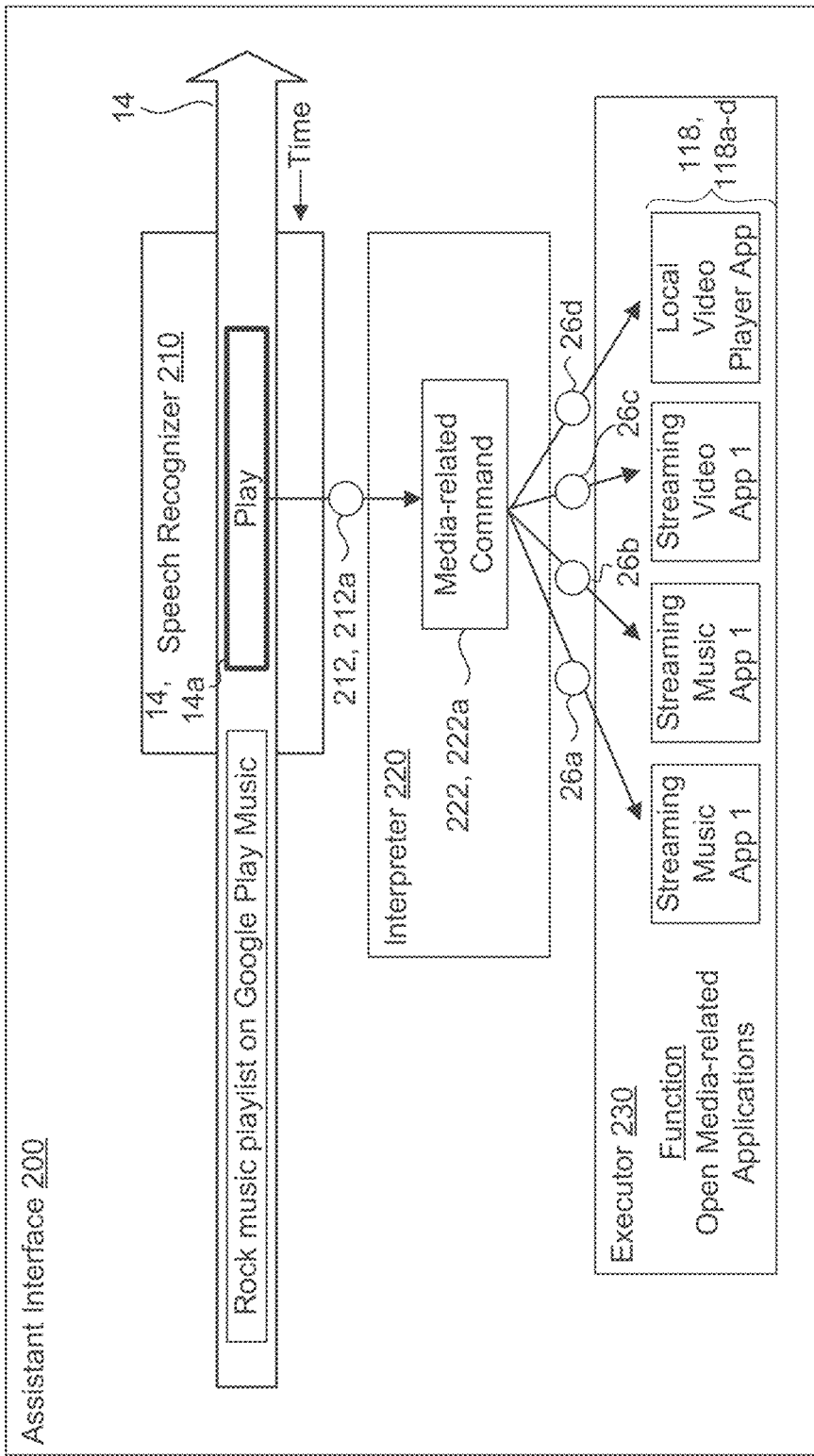

FIGS. 2E-2H show an example interface 200 while the executor 230 is executing multiple tasks in parallel based on an utterance 20 spoken by the user 10. In this example, the user 10 speaks an utterance 20 directed toward the device 110 that includes a query 22 "play rock music playlist on Google Play music." When the user 10 speaks the utterance 20, the interface receives the audio data 14 corresponding to the utterance 20 and relays the audio data 14 to the speech recognizer 210. For a first portion 14, 14a of the audio data 14 including the word "play," the speech recognizer 210 provides a first sequence of intermediate speech recognition results 212, 212a as shown in FIG. 2E. The interpreter 220 receives and performs partial query interpretation on the first sequence of speech recognition results 212a to obtain a first interpretation 222, 222a. Based on the word "play," the first interpretation 222a indicates that the audio data 14 includes a media-related command to execute a media type of application 118 and the executor 230 performs a first set of four sub-actions 26, 26a-d that launch four different applications 118, 118a-d on the device 110. The first application 118a includes a first music streaming application, Google Play. The second application 118b includes a second music streaming application, Spotify. The third application 118c includes a video streaming application, YouTube, and the fourth application 118d includes a local generic video player application called "video player." These four applications 118a-d may be launched to execute in parallel on the device 110 as the sequence of sub-actions 26 continues and the query/command spoken in the utterance 20 becomes more specific. When the executor 230 launches these applications 118a-d, these applications 118a-d may appear on the device 110 in one or more windows (e.g., a cascade of windows or a panel of windows). Because the first portion of the utterance 20 lacks a clear and identifiable application 118 to "play" something, the interpreter 220 generates multiple candidate sub-actions 26a-d, which may include all of the media type of applications 118 rather than a specific application 118 at this point when the interface is beginning to perform the action 24 corresponding the command 22 of the utterance 20. Furthermore, since the execution process for each sub-action 26 may be displayed on the display 116 of the device 110 for the user 10, the user 10 (e.g., while speaking the utterance 20), may engage with the display 116 to further facilitate or modify the sub-actions 26. For instance, with four applications 118 displayed for the user 10, the user 10 may close one or more applications 118 by interacting with a GUI element of a GUI 240 for the application 218 that has the functionality to terminate a selected application 118. In contrast, the user 10 may additionally or alternatively select which applications 118 to keep rather than to terminate. In yet another example, the user 10 may select to keep an application 118 and also to terminate an application 118.

Figure 2F:
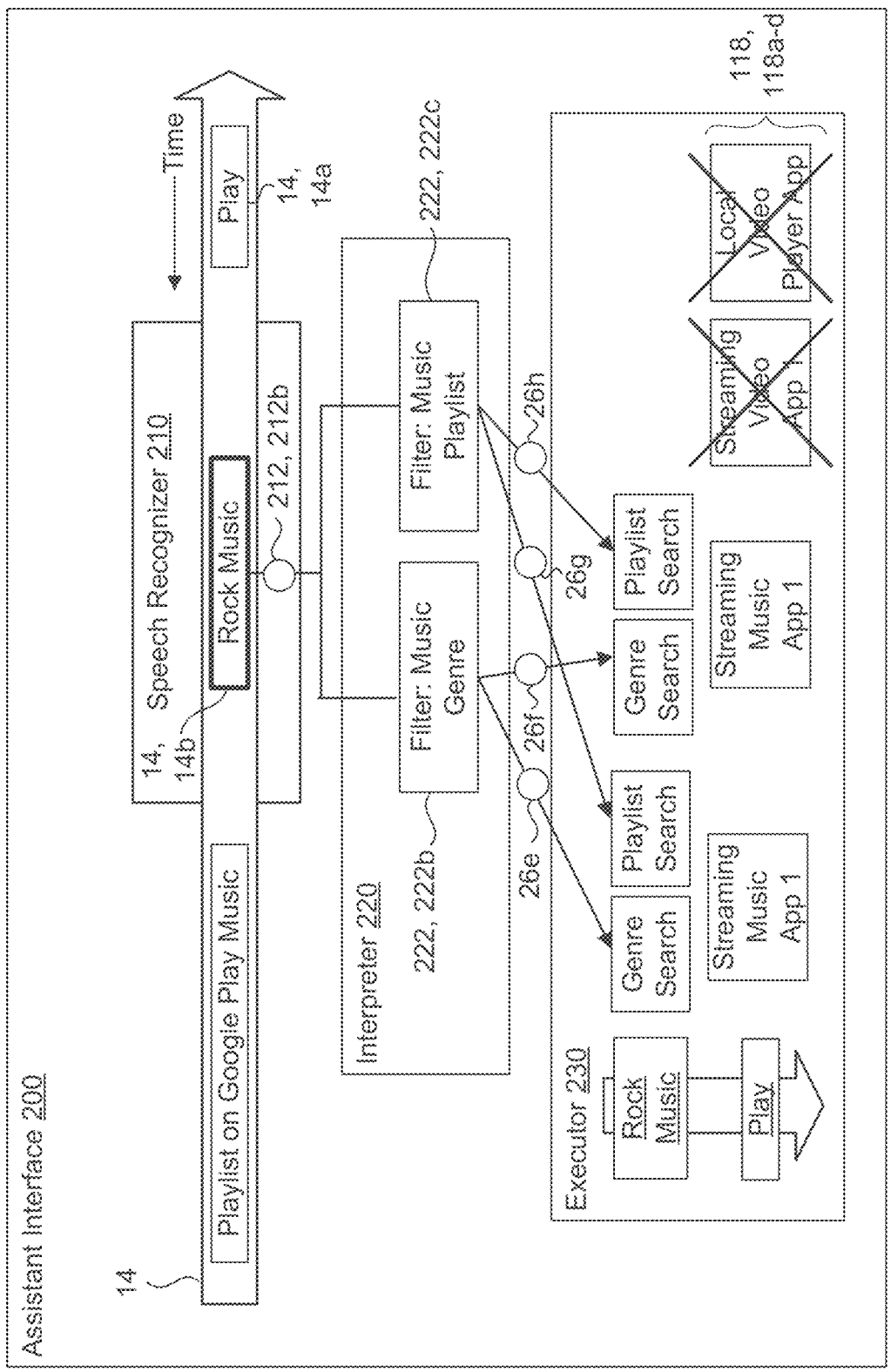

As the user 10 continues to speak the utterance 20, FIG. 2F depicts the speech recognizer 210 performing speech recognition over a second portion 14b of the audio data 14 relating to the words "rock music" to generate a second sequence of intermediate speech recognition results 212, 212b. The interpreter 220 interprets that the second sequence of intermediate speech recognition results 212b to obtain two different interpretations 222, 222b-c. A first interpretation 222b where "rock music" refers to a genre of music (i.e., the genre of rock music) or a second interpretation 222 where "rock music" refers to a playlist (e.g., playlist title) for the user 10. Since both of these interpretations 222b-c may have a confidence level that satisfies the confidence threshold, the executor 230 may generate parallel processes to execute both interpretations 222b-c on each application 118 launched and open from the first set of sub-actions 26a-d.

The executor 230 may also use the second interpretation 222b and the third interpretation 222c as a validity check to determine if any of the sub-actions 26 in the first set of sub-actions 26a-d should be rolled back (e.g., terminated). Since two of the applications 118c-d were applications for video (e.g., streaming video or a local video player), performing the validity check against the second interpretation 222b and the third interpretation 222c results in the executor 230 terminating the video-based applications 118c-d that were launched based on a third and a fourth sub-action 26, 26c-d. With this being the case, executing both interpretations 222b-c only has to occur at the first application 118a and the second application 118b. This execution process therefore forms a second set of sub-actions 26e-h where four parallel action sequences are occurring as shown in FIG. 2F.

Figure 2G:
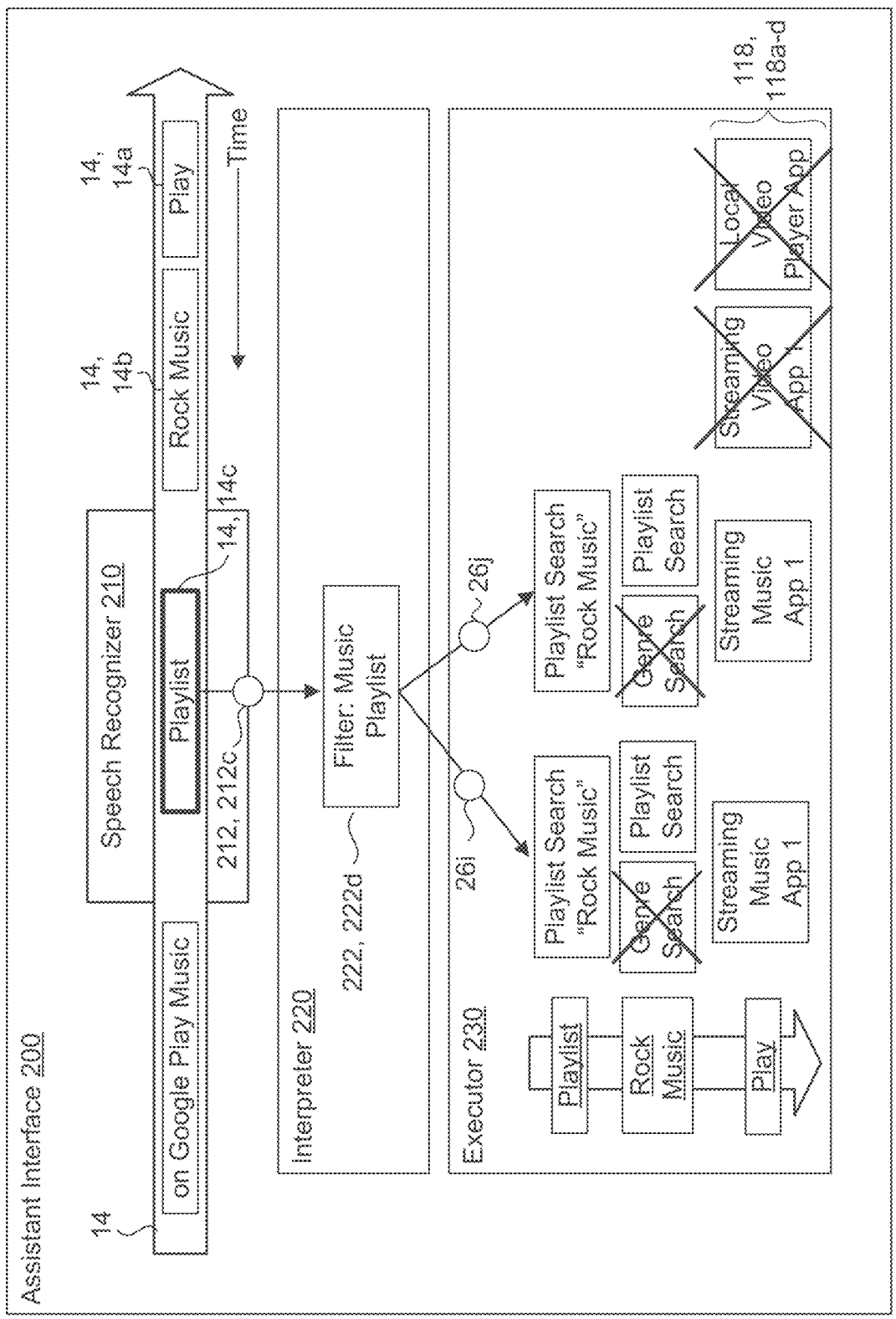
Figure 2H:
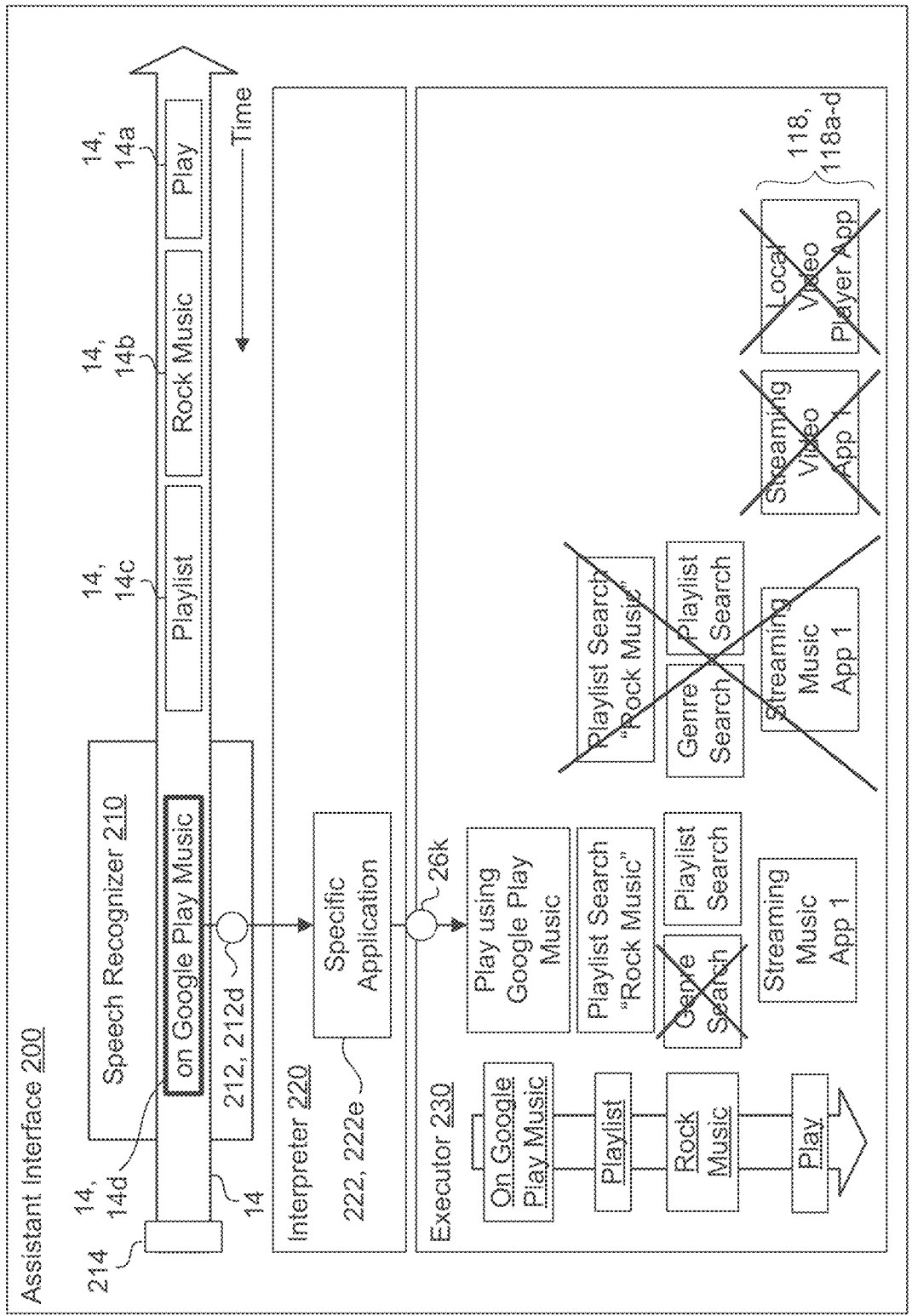

In FIG. 2G, while the user 10 continues to speak the utterance 20, the speech recognizer 210 performs speech recognition over a third portion 14c of the audio data 14 relating to the word "playlist" to generate a third sequence of intermediate speech recognition results 212, 212c that the interpreter 220 performs partial query interpretation on to determine a fourth interpretation 222, 222d. In this step of the processing, the interpreter 220 may be able to recognize that this sequence of intermediate speech recognition results 212, 212c clarifies some of the ambiguity of the second and third interpretations 222b-c. Namely, that "rock music" should not have been interpreted as a genre search for music, but rather referred to a playlist called "rock music." Based on these additional context clues, the executor 230 has terminated any of the processes that were executing on the premise that "rock music" may correspond to a genre. After the termination of these processes, this leaves two remaining action sequences, one for the first streaming music application 118 of Google Play music and one for the second streaming music application 118 of Spotify. At this point in the action sequence, each application 118 has been launched and has searched for the playlist "rock music" according to the sub-actions 26i-j corresponding to the fourth interaction 222d.

In FIG. 2G, the user 10 speaks the final portion of the utterance 20. While the user 10 speaks the final portion of the utterance 20 and before an endpoint 214 (FIG. 2H) (or end of speech condition) of the utterance 20, the speech recognizer 210 performs speech recognition over a fourth portion 14, 14d of the audio data 14 relating to the words, "on Google Play music." Here, the speech recognizer 210 generates a fourth sequence of intermediate speech recognition results 212, 212d for the fourth portion 14d of the audio data 14. The speech recognizer 210 relays the fourth sequence of intermediate speech recognition results 212d to the interpreter 220 and the interpreter 220 performs a partial query interpretation to generate a fifth interpretation 222, 222e that identifies the fourth sequence of intermediate speech recognition results 212d as uniquely designating a particular application, Google Play music. In other words, although this specific application 118 was defined at the end of the utterance 20, this application 118 was already executing while the user 10 was speaking because of the context of the utterance 20 preceding this portion of the words "on Google Play music." Based on this fifth interpretation 222e, the executor 230 ceases the execution of the Spotify application 118. Additionally, when the endpoint 214 of the utterance 20 occurs, the interpreter 220 may then compare the sub-action sequence to the action 24 to fulfill the full speech recognition result from the speech recognizer 210.

Figure 3:
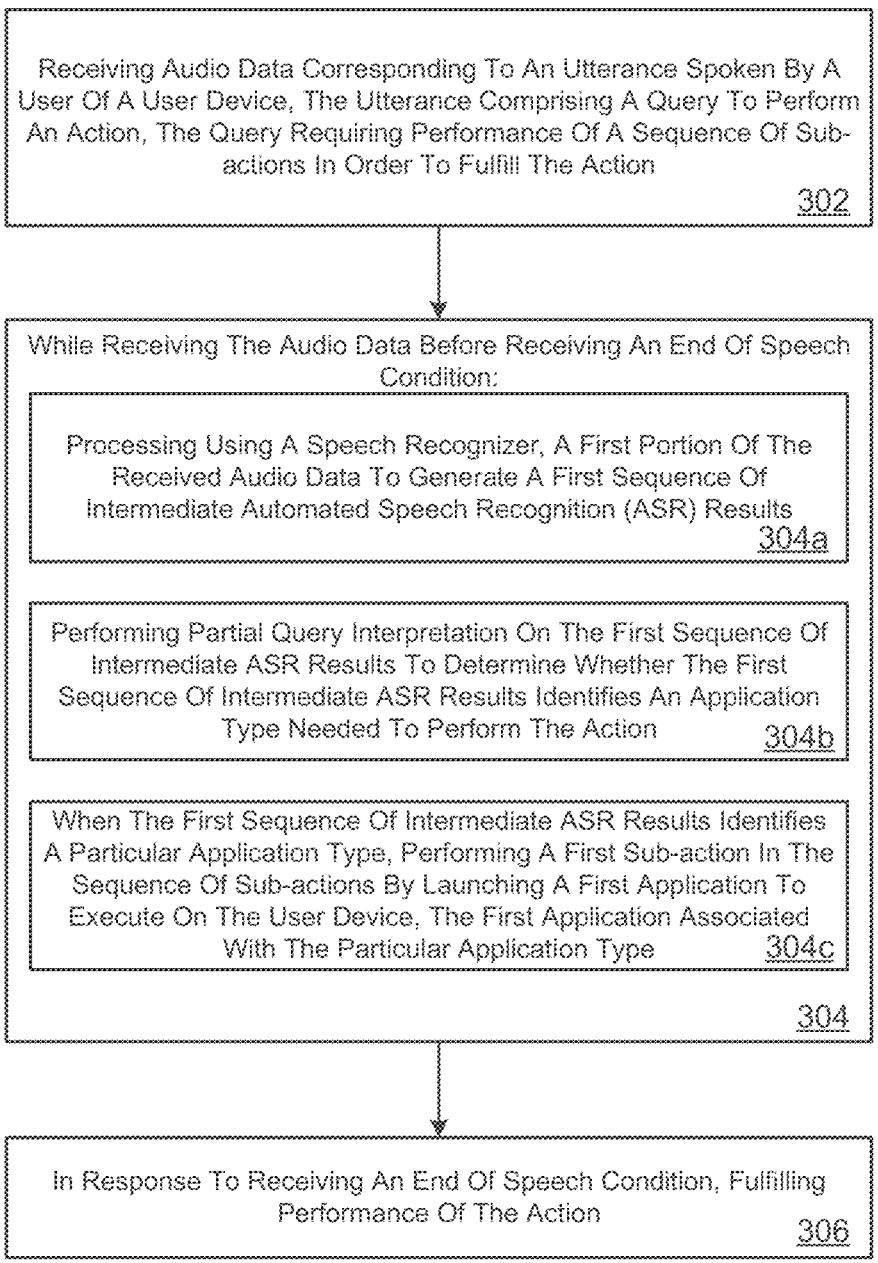
FIG. 3 is a flowchart of an example arrangement of operations for a method of performing fulfillment based on partial speech recognition results.

FIG. 3 is a flowchart of an example arrangement of operations for streaming action fulfillment based on partial hypotheses. At operation 302, the method 300 receives audio data 14 corresponding to an utterance 20 spoken by a user 10 of a user device 110 where the utterance 20 includes a query 22 to perform an action 24 where the query 22 requires performance of a sequence of sub-actions 26 in order to fulfill the action 24. Operation 304 includes three sub-operations 304, 304a-c that occur while the method 300 receives the audio data 14, but before receiving an end of speech condition 214. At operation 304a, the method 300 processes, using a speech recognizer 210, a first portion 14, 14a of the received audio data 14 to generate a first sequence of intermediate automated speech recognition (ASR) results 212. At operation 304b, the method 300 performs partial query interpretation on the first sequence of intermediate ASR results 212 to determine whether the first sequence of intermediate ASR results 212 identifies an application type needed to perform the action. At operation 304c, when the first sequence of intermediate ASR results 212 identifies a particular application type, performing a first sub-action 26 in the sequence of sub-actions 26, 26a-n by launching a first application 118 to execute on the user device 110 where the first application 118 is associated with the particular application type. At operation 306, the method 300 includes, in response to receiving an end of speech condition 214, fulfilling performance of the action 24.

Figure 4:
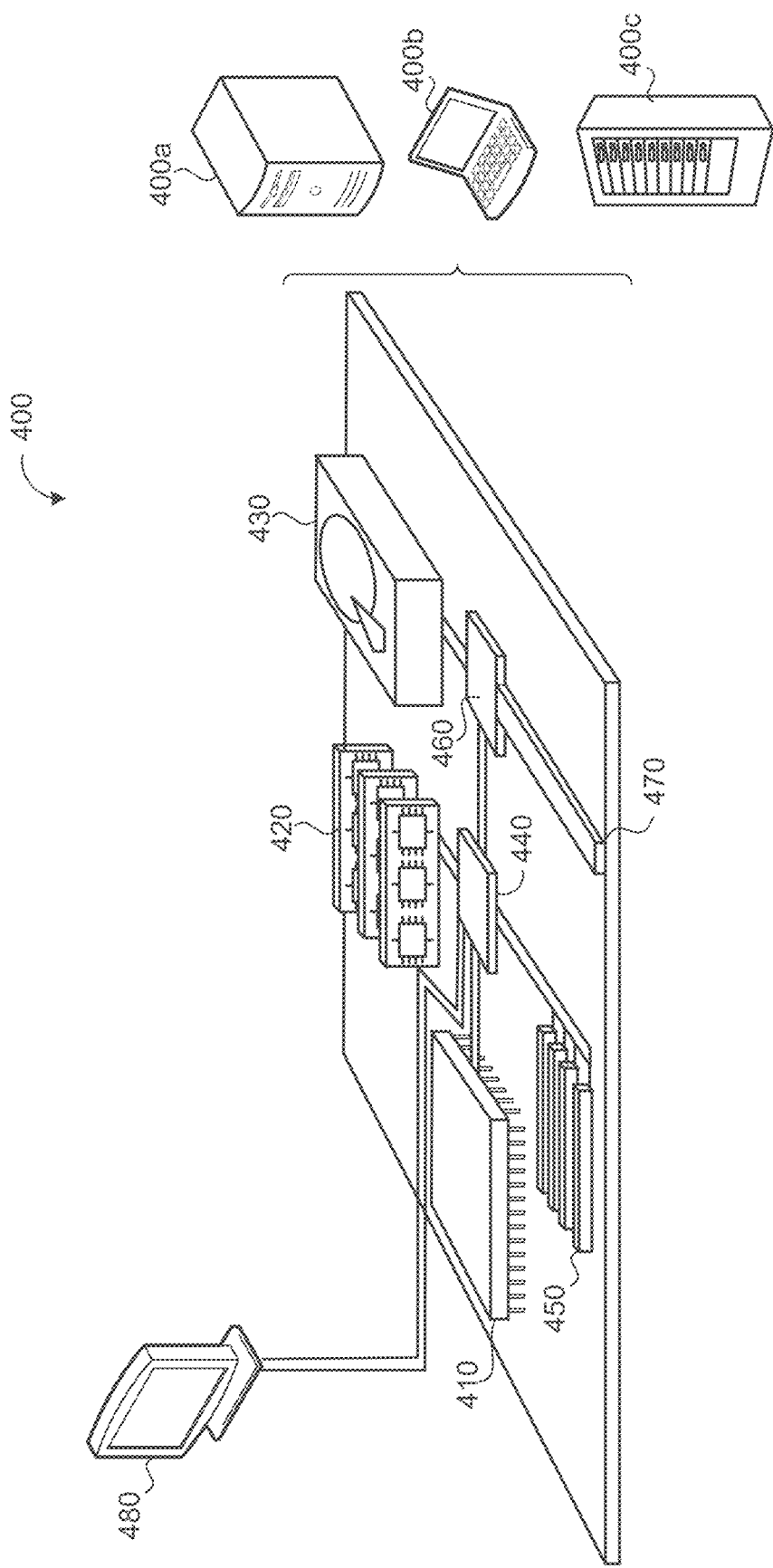
FIG 4 is a schematic view of an example computing device that may be used to implement the systems and methods described herein.

FIG. 4 is a schematic view of an example computing device 400 that may be used to implement the systems (e.g., the interface 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory-on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data corresponding to an utterance spoken by a user of a user device, the utterance comprising a query to perform an action, the query requiring performance of a sequence of sub-actions in order to fulfill the action;
   while receiving the audio data before receiving an end of speech condition:
      processing, by the data processing hardware, using a speech recognizer, a first portion of the received audio data to generate a first sequence of intermediate automated speech recognition (ASR) results;
      performing, by the data processing hardware, partial query interpretation on the first sequence of intermediate ASR results to determine whether the first sequence of intermediate ASR results identifies an application type needed to perform the action; and
      when the first sequence of intermediate ASR results identifies a particular application type, performing, by the data processing hardware, a first sub-action in the sequence of sub-actions by launching a first application to execute on the user device, the first application associated with the particular application type; and
   in response to receiving an end of speech condition, fulfilling, by the data processing hardware, performance of the action.

2. The method of claim 1, further comprising, while receiving the audio data before receiving the end of speech condition and after launching the first application:
   processing, by the data processing hardware, using the speech recognizer, a second portion of the received audio data to generate a second sequence of intermediate ASR results;
   performing, by the data processing hardware, the partial query interpretation on the second sequence of intermediate ASR results to identify a search query for content in the first application; and
   performing, by the data processing hardware, a second sub-action in the sequence of actions by instructing the first application to perform the search query for the content in the first application.

3. The method of claim 2, further comprising, in response to launching the first application to execute on the user device:
   displaying, by the data processing hardware, in a graphical user interface of the user device, an initial screen having a search field and/or multiple graphical elements each representing different categories of content in the first application,
   wherein instructing the first application to perform the search query for the content comprises:
      entering, into the search field of the first screen, text characterizing the search query for the content in the first application; or
      selecting, from among the multiple graphical elements of the first screen, the graphical element representing the category of content that includes the content specified by the search query.

4. The method of claim 3, further comprising, after the first application performs the search query for the content, displaying, by the data processing hardware, in the graphical user interface, a second screen presenting one or more results that comprise the content specified by the search query.

5. The method of claim 4, further comprising:
receiving, at the data processing hardware, a user input indication indicating selection of one of the results presented in the second screen;
in response to receiving the user input indication, detecting, by the data processing hardware, the end of speech condition.

6. The method of claim 2, further comprising, after the first application performs the search query for the content:
processing, by the data processing hardware, using the speech recognizer, a third portion of the received audio data to generate a third sequence of intermediate ASR results;
performing, by the data processing hardware, the partial query interpretation on the third sequence of intermediate ASR results to determine whether to update the search query for more specific content; and
when the partial query interpretation performed on the third sequence of intermediate search results determines to update the search query for more specific content, performing, by the data processing hardware, a third sub-action in the sequence of sub-actions by instructing the first application to update the search query for the more specific content.

7. The method of claim 1, wherein:
performing the partial query interpretation on the first sequence of intermediate ASR results determines that the first sequence of intermediate ASR results identifies the particular application type and fails to specify a slot value associated with naming a specific application for use in fulfilling the action; and
wherein performing the first sub-action in the sequence of sub-actions comprises launching the first application as a default application associated with the particular application type.

8. The method of claim 7, further comprising, while receiving the audio data before receiving the end of speech condition and after launching the first application:
processing, by the data processing hardware, using the speech recognizer, a second portion of the received audio data to generate a second sequence of intermediate ASR results;
performing, by the data processing hardware, the partial query interpretation on the second sequence of intermediate ASR results to determine whether the second sequence of intermediate ASR results identify a second application to use for fulfilling the action; and
when the second sequence of intermediate ASR results identify the second application for use in fulfilling the action:
rolling-back, by the data processing hardware, performance of the first sub-action by ceasing execution of the first application on the user device; and
re-performing, by the data processing hardware, the first sub-action in the sequence of actions by launching the second application to execute on the user device.

9. The method of claim 1, further comprising, while receiving the audio data before receiving the end of speech condition:

when the first sequence of intermediate ASR results identifies the particular application type, performing, by the data processing hardware, the first sub-action in the sequence of sub-actions by launching both the first application and a second application to execute in parallel on the user device, the first application and the second application both associated with the particular application type; and
displaying, by the data processing hardware, in a graphical user interface of the user device, a first graphical element and a second graphical element simultaneously, the first graphical element representing the first application executing on the user device and the second graphical element representing the second graphical element executing on the user device.

10. The method of claim 9, further comprising:
receiving, at the data processing hardware, a user input indication indicating selection of one of the first graphical element or the second graphical element displayed in the graphical user interface; and
in response to receiving the user input indication:
maintaining, by the data processing hardware, execution of the one of the first application or the second application that is represented by the selected one of the first graphical element or the second graphical element; and
ceasing, by the data processing hardware, execution of the other one of the first application or the second application that is represented by the one of the first graphical element or the second graphical element that was not selected by the user input indication.

11. The method of claim 1, further comprising, while receiving the audio data before receiving the end of speech condition and after launching the first application:
processing, by the data processing hardware, using the speech recognizer, a second portion of the received audio data to generate a second sequence of intermediate ASR results;
performing, by the data processing hardware, the partial query interpretation on the second sequence of intermediate ASR results to identify a second sub-action in the sequence of sub-actions;
determining, by the data processing hardware, a rollback feasibility score associated with the second sub-action, the rollback feasibility indicating a likelihood that a user experience will be degraded if executing the second sub-action has to be rolled back; and
when the rollback feasibility score satisfies a rollback feasibility threshold, performing, by the data processing hardware, the second sub-action.

12. The method of claim 11, further comprising, when the rollback feasibility score does not satisfy the rollback feasibility threshold, delaying performing, by the data processing hardware, the second sub-action until the end of speech condition is received.

13. The method of claim 11, further comprising:
determining, by the data processing hardware, a confidence score of second sub-action identified by performing the partial query interpretation on the second sequence of intermediate ASR results; and
when the confidence score of the second sub-action fails to satisfy a confidence threshold, prompting, by the data processing hardware, the user to confirm whether the second sub-action is correctly identified.

14. The method of claim 1, wherein determining the end of speech condition comprises detecting, using the speech recognizer, at least a minimum duration of non-speech in the received audio.

15. A system comprising:
data processing hardware; and
memory hardware in communication with the data processing hardware, the memory hardware storing instructions that when executed on the data processing hardware cause the data processing hardware to perform operations comprising:
receiving audio data corresponding to an utterance spoken by a user of a user device, the utterance comprising a query to perform an action, the query requiring performance of a sequence of sub-actions in order to fulfill the action;
while receiving the audio data before receiving an end of speech condition:
processing using a speech recognizer, a first portion of the received audio data to generate a first sequence of intermediate automated speech recognition (ASR) results;
performing partial query interpretation on the first sequence of intermediate ASR results to determine whether the first sequence of intermediate ASR results identifies an application type needed to perform the action; and
when the first sequence of intermediate ASR results identifies a particular application type, performing a first sub-action in the sequence of sub-actions by launching a first application to execute on the user device, the first application associated with the particular application type; and
in response to receiving an end of speech condition, fulfilling, by the data processing hardware, performance of the action.

16. The system of claim 15, wherein the operations further comprise, while receiving the audio data before receiving the end of speech condition and after launching the first application:
processing using the speech recognizer, a second portion of the received audio data to generate a second sequence of intermediate ASR results;
performing the partial query interpretation on the second sequence of intermediate ASR results to identify a search query for content in the first application; and
performing a second sub-action in the sequence of actions by instructing the first application to perform the search query for the content in the first application.

17. The system of claim 16, wherein the operations further comprise, in response to launching the first application to execute on the user device:
displaying, by the data processing hardware, in a graphical user interface of the user device, an initial screen having a search field and/or multiple graphical elements each representing different categories of content in the first application,
wherein instructing the first application to perform the search query for the content comprises:
entering, into the search field of the first screen, text characterizing the search query for the content in the first application; or
selecting, from among the multiple graphical elements of the first screen, the graphical element representing the category of content that includes the content specified by the search query.

18. The system of claim 17, wherein the operations further comprise, after the first application performs the search query for the content, displaying, in the graphical user interface, a second screen presenting one or more results that comprise the content specified by the search query.

19. The method of claim 18, wherein the operations further comprise:
receiving a user input indication indicating selection of one of the results presented in the second screen;
in response to receiving the user input indication, detecting the end of speech condition.

20. The system of claim 16, wherein the operations further comprise, after the first application performs the search query for the content:
processing, by the data processing hardware, using the speech recognizer, a third portion of the received audio data to generate a third sequence of intermediate ASR results;
performing, by the data processing hardware, the partial query interpretation on the third sequence of intermediate ASR results to determine whether to update the search query for more specific content; and
when the partial query interpretation performed on the third sequence of intermediate search results determines to update the search query for more specific content, performing, by the data processing hardware, a third sub-action in the sequence of sub-actions by instructing the first application to update the search query for the more specific content.

21. The system of claim 15, wherein:
performing the partial query interpretation on the first sequence of intermediate ASR results determines that the first sequence of intermediate ASR results identifies the particular application type and fails to specify a slot value associated with naming a specific application for use in fulfilling the action; and
wherein performing the first sub-action in the sequence of sub-actions comprises launching the first application as a default application associated with the particular application type.

22. The system of claim 21, wherein the operations further comprise, while receiving the audio data before receiving the end of speech condition and after launching the first application:
processing using the speech recognizer, a second portion of the received audio data to generate a second sequence of intermediate ASR results;
performing the partial query interpretation on the second sequence of intermediate ASR results to determine whether the second sequence of intermediate ASR results identify a second application to use for fulfilling the action; and
when the second sequence of intermediate ASR results identify the second application for use in fulfilling the action:
rolling-back performance of the first sub-action by ceasing execution of the first application on the user device; and
re-performing the first sub-action in the sequence of actions by launching the second application to execute on the user device.

23. The system of claim 15, wherein the operations further comprise, while receiving the audio data before receiving the end of speech condition:
when the first sequence of intermediate ASR results identifies the particular application type, performing the first sub-action in the sequence of sub-actions by launching both the first application and a second application to execute in parallel on the user device, the first application and the second application both associated with the particular application type, and displaying in a graphical user interface of the user device, a first graphical element and a second graphical element simultaneously, the first graphical element representing the first application executing on the user device and the second graphical element representing the second graphical element executing on the user device.

24. The system of claim 23, wherein the operations further comprise:

receiving a user input indication indicating selection of one of the first graphical element or the second graphical element displayed in the graphical user interface; and in response to receiving the user input indication:
maintaining execution of the one of the first application or the second application that is represented by the selected one of the first graphical element or the second graphical element; and
ceasing execution of the other one of the first application or the second application that is represented by the one of the first graphical element or the second graphical element that was not selected by the user input indication.

25. The system of claim 15, wherein the operations further comprise, while receiving the audio data before receiving the end of speech condition and after launching the first application:

processing using the speech recognizer, a second portion of the received audio data to generate a second sequence of intermediate ASR results;

performing the partial query interpretation on the second sequence of intermediate ASR results to identify a second sub-action in the sequence of sub-actions;

determining, a rollback feasibility score associated with the second sub-action, the rollback feasibility indicating a likelihood that a user experience will be degraded if executing the second sub-action has to be rolled back; and when the rollback feasibility score satisfies a rollback feasibility threshold, performing, by the data processing hardware, the second sub-action.

26. The system of claim 25, wherein the operations further comprise, when the rollback feasibility score does not satisfy the rollback feasibility threshold, delaying performing the second sub-action until the end of speech condition is received.

27. The system of claim 25, wherein the operations further comprise:

determining a confidence score of second sub-action identified by performing the partial query interpretation on the second sequence of intermediate ASR results; and when the confidence score of the second sub-action fails to satisfy a confidence threshold, prompting the user to confirm whether the second sub-action is correctly identified.

28. The system of claim 15, wherein determining the end of speech condition comprises detecting, using the speech recognizer, at least a minimum duration of non-speech in the received audio.

* * * * *